No. 834,465. PATENTED OCT. 30, 1906.
W. R. FINE.
TRAP.
APPLICATION FILED MAY 7, 1906.
3 SHEETS—SHEET 2.
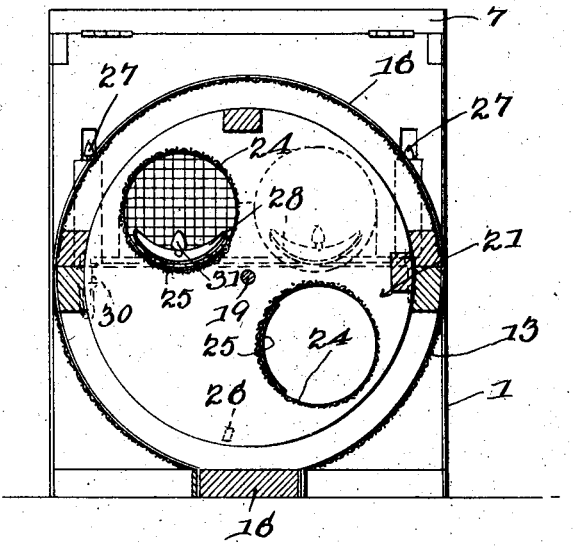
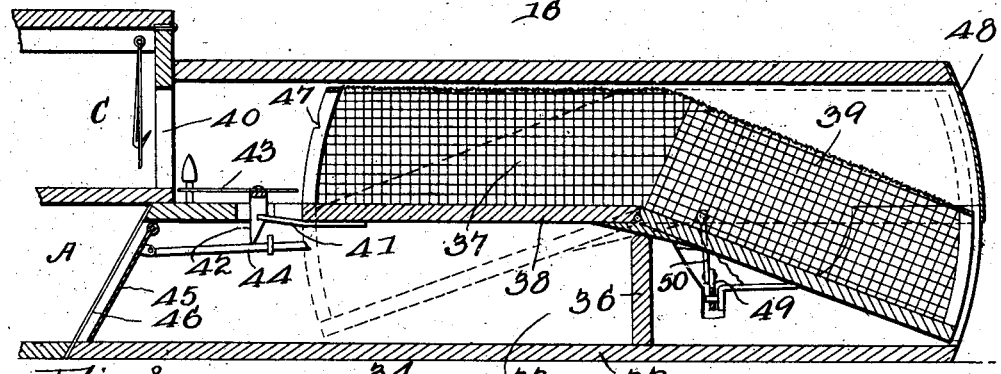
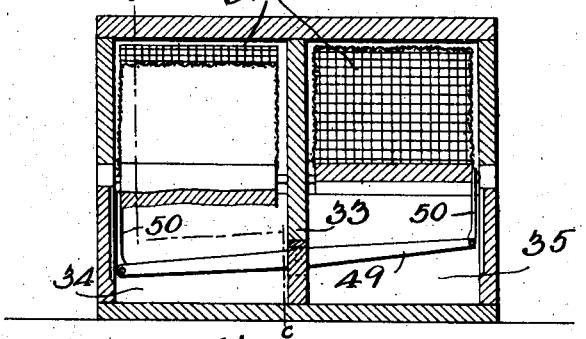
WITNESSES:
William R. Fine,
INVENTOR.
By
ATTORNEYS No. 834,465. PATENTED OCT. 30, 1906.
W. R. FINE.
TRAP.
APPLICATION FILED MAY 7, 1906.

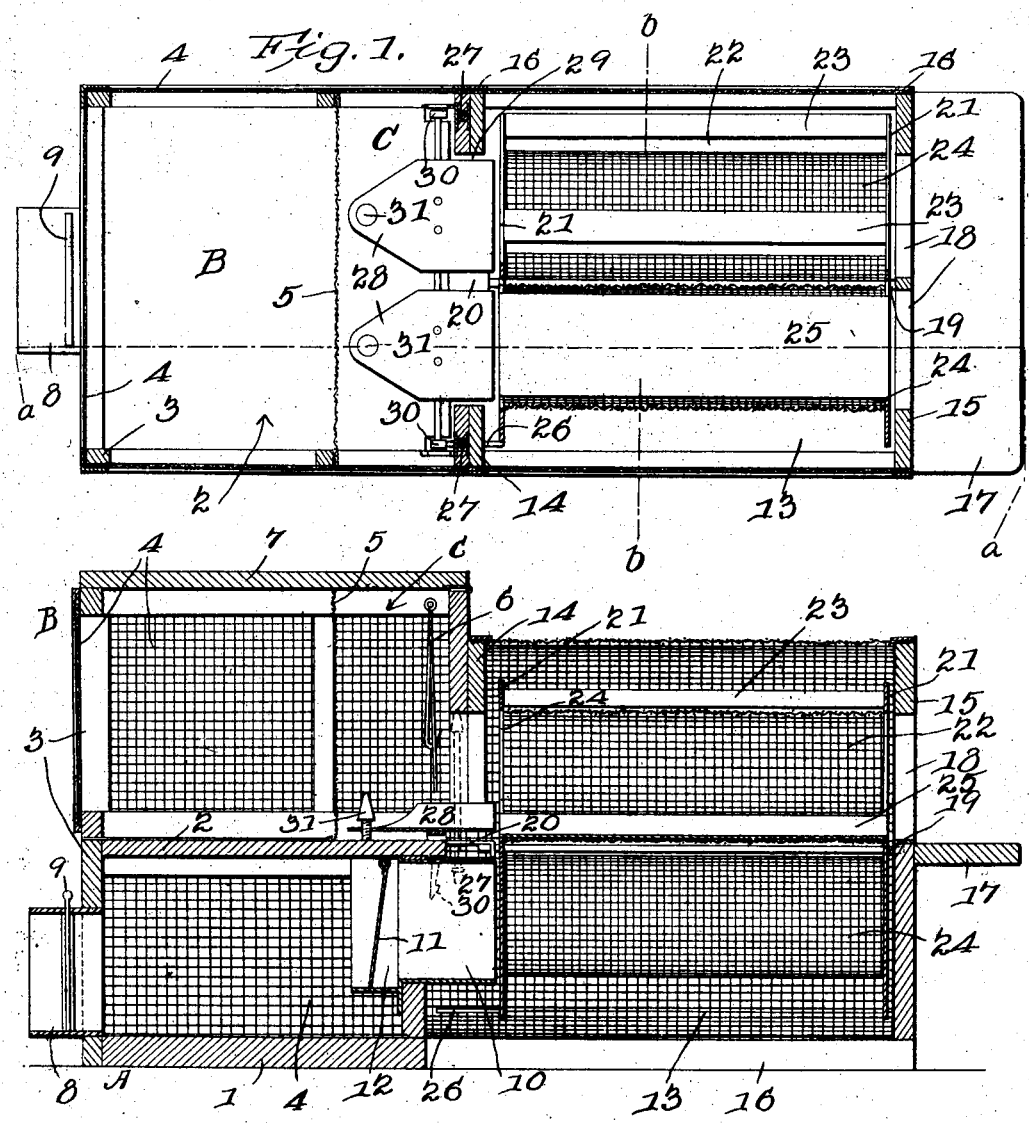

3 SHEETS—SHEET 3.

WITNESSES:
E. K. Stewart.
Hubert D. Lawson.

William R. Fine INVENTOR.
By C. A. Snow & Co.
ATTORNEYS

UNITED STATES PATENT OFFICE.

WILLIAM RANKIN FINE, OF NEWPORT, TENNESSEE.

TRAP.

No. 834,465.      Specification of Letters Patent.      Patented Oct. 30, 1906.

Application filed May 7, 1906. Serial No. 315,601.

*To all whom it may concern:*

Be it known that I, WILLIAM RANKIN FINE, a citizen of the United States, residing at Newport, in the county of Cocke and State of Tennessee, have invented a new and useful Trap, of which the following is a specification.

This invention relates to traps, and more particularly to devices of this character commonly termed "self-setting" traps.

The object of the invention is to provide a trap having a movable flue through which an animal can pass in order to seek bait adapted to be placed adjacent the flue, and means are provided whereby the flue, which is normally locked, will be released by the animal, so that the flue will move downward under the weight of said animal and register with an outlet-opening into a cage or compartment, from which the animal cannot escape after once entering it.

Another object is to so arrange flues or passages in relation to each other that when one of them is carried downward by the weight of an animal another one will be moved in position and locked to receive another animal, and the operation can then be continued by animals entering the flues alternately.

With the above and other objects in view the invention consists of a casing in which are mounted flues or passages which are adapted to alternately move into position to admit an animal. Each flue when in this position alines with a bait-holder which is plainly visible to the animal looking through the flue. A locking device is provided for holding the flue in this position and has release mechanism adapted to be actuated by an animal within the flue, so that the flue holding it will drop into register with an outlet-opening into a cage or compartment from which the animal cannot escape. This downward movement of the flue containing the animal will cause an opposite movement of another flue, which will thus be brought into position and locked to receive another animal, which in turn will be carried downward in the same manner to the receiving-compartment, thereby resetting the first-mentioned flue.

The invention also consists of certain other novel features of construction and combinations of parts, which will be hereinafter more fully described, and pointed out in the claims.

In the accompanying drawings is shown the preferred form of the invention.

Figure 4:
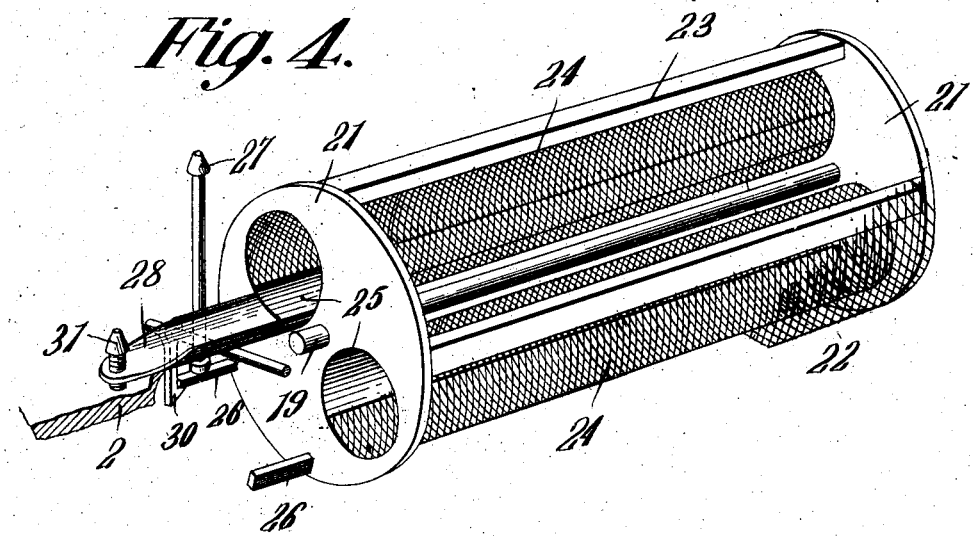
Figures 5, 6:
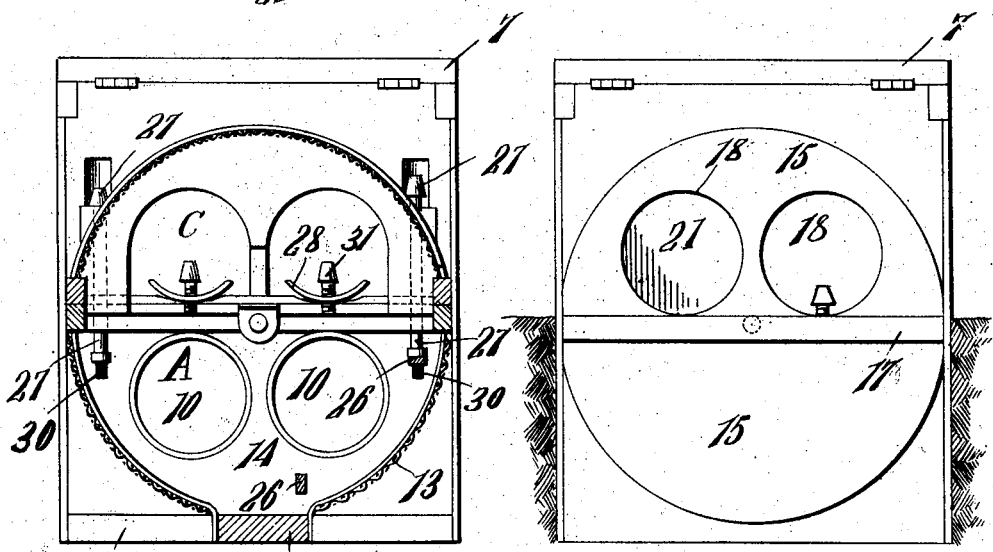
Figure 7:
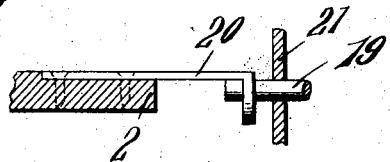

In said drawings, Figure 1 is a horizontal section through the trap. Fig. 2 is a vertical longitudinal section therethrough on line $a\,a$, Fig. 1. Fig. 3 is a transverse section on line $b\,b$, Fig. 1. Fig. 4 is a perspective view of the rotatable cylindrical casing removed from the trap and showing one of the releasing-plates in position, all but a portion of the fabric wall of the casing being removed. Fig. 5 is a section through the complete trap, taken between the releasing-plates and the flues, the arms extending from the flues being shown in section. Fig. 6 is a front elevation of the trap. Fig. 7 is an enlarged section through a portion of the horizontal partition of the trap and showing the inner bearing of the shaft of the flues. Fig. 8 is a longitudinal section through a modified form of the trap; and Fig. 9 is a transverse section through said modified form, taken on line $c\,c$, Fig. 8.

Referring to the figures by characters of reference, 1 is a casing having a horizontal partition 2 therein, which forms a lower receiving-compartment A and an upper live-bait compartment B. This casing may be formed in any suitable manner, but preferably of wooden framework 3, having wire fabric 4 secured thereon formed of side and end walls. The partition 5 of fabric extends transversely of the compartment B, so as to form a front compartment C within the upper portion of the casing, said compartment having hooks 6 or other suitable devices suspended therein for the purpose of holding meat or other similar bait. A cover 7 is hinged upon the casing 1, so that access may be readily had to the bait-compartments B and C, and an outlet 8 extends from the lower compartment A and is normally closed by a sliding gate 9.

Within the front wall of compartment A are disposed tubular inlets 10, at the inner ends of which are hung closures 11, which are mounted within a housing 12, projecting into the compartment A from its front wall. These tubular inlets 10 project into a cylindrical casing 13, preferably formed of wire fabric secured between circular heads 14 and 15, which are connected by longitudinally-extending strips 16. The upper half of the casing 13 is adapted to project above ground or may be provided with a ledge 17, to which inclined boards (not shown) may be extended. The upper portion of the head 15 has two openings 18 therein, and journaled within the head 15 between these openings is one end of a rod 19, the other end of which is mounted within a suitable supporting-bracket 20, extending from the front end of the casing 1. Rod 19 projects through the centers of heads 21, formed at the ends of a rotatable cylindrical casing 22, all portions of said casing except the heads 21 being formed of wire fabric. The two heads 21 are connected by longitudinally-extending bars 23, so as to produce a rigid structure. Extending through the casing 22 are cylindrical flues 24, each formed, preferably, or wire fabric and opening through the heads 21. These flues are so disposed in relation to each other that when one of them registers with its inlet-opening 18 the other one will register with one of the outlets 10. Each flue has a metal floor 25, which presents a smooth surface on which an animal may walk after entering the opening 18. Arms 26 extend from the inner head 21 of the casing 22, and slidably mounted in the front wall of the casing 1 are weighted rods 27, which are slidably mounted within the casing and project into the paths of the arms 26, so that when the casing 22 is rotating in either direction one of the arms 26 will strike one of the weighted rods 27 and partly raise it, said rod therefore constituting a cushioning means for preventing the casing 21 from coming to a sudden stop.

A releasing-plate 28 is disposed within openings 29, formed in the front wall of the compartment C, said openings being disposed in alinement with the openings 18. These tripping-plates are adapted to aline with the floor 25 of the flues when said flues are in raised positions. Each tripping-plate has a hooked arm 30, which extends downward therefrom into the path of one of the arms 26. These arms 30 are so disposed in relation to the weighted rods 27 that immediately subsequent to the stoppage of the movement of arms 26 by one of the rods 27 the hook 30 will engage the arm 26 and lock it against return movement. One of the flues 24 will thus be locked in alinement with one of the openings 18 and 29, while the other one will be secured in alinement with one of the outlet-tubes 10. An adjusting-screw 31 is arranged within each tripping-plate for the purpose of shifting said plate so as to regulate the degree of engagement by the arm 30 with arm 26. The bars 23 are disposed only above flues 24, as is clearly shown in Fig. 3, and constitute weights for facilitating the rotation of the casing 22 during the latter portion of the downward movement of one of the flues.

It is thought that the operation of this trap will be fully understood in view of the foregoing description. Neat or other suitable bait of a like nature may be suspended from the hooks 6, or, if preferred, live bait may be placed within the compartment B. This bait will be visible through the flue 24, registering with one of the openings 18, and an animal upon seeing it will enter the flue and walk along the floor 25 thereof until the other end is reached. As soon as a paw is placed on the tripping-plate 29 at the other end of the flue the hooked arm 30 of said plate will be swung backward out of engagement with the arm 26, and as the casing 22 will thus be unlocked the same will immediately partly rotate by reason of the weight of the animal contained therein, and this rotation will continue until the other arm 26 strikes the weighted rod 27 in the path thereof, whereupon said arm 26 will be engaged and locked by the arm 30 of the other tripping-plate 28. The flue containing the animal will thus be brought into alinement with one of the tubular outlets 10, and the animal will immediately press against the closure 11 and swing it open. The animal will then enter the compartment A, and the closure 11 will be immediately dropped back into its initial position. The rotation of the casing 22, which is produced in this manner, will bring the other flue 24 into register with the other opening 18, and the trap is thus reset, and should an animal enter the exposed flue and trip the plate 28 at the inner end thereof the foregoing operation will be repeated and the other flue will be reset. It will thus be seen that the operation can be continued indefinitely and the device is always in condition to trap an animal.

Instead of utilizing flues shown in Figs. 1 and 3, inclusive, the modified forms illustrated in Figs. 4 and 5 may be employed. This form consists of a substantially rectangular casing 32, separated by a partition 33 into parallel compartments, 34 and 35. A transverse partition 36 extends through the lower portion of these compartments, and fulcrumed thereon are annular flues 37, which preferably consist of a floor 38 and a casing 39, which is made of wire fabric. The front ends of the compartments 34 and 35 are open at their lower portions, and the flues 37 are adapted to assume positions with one end registering with the openings, and when in these positions the other ends of the flues will register with the inlet-openings 40 of the compartment C.

Each of the flues 37 has an arm 41, adapted to be engaged by a hooked arm 42, depending from a tripping-plate 43, so that after an animal travels up the inclined front end of the flue and to the inner end thereof downward pressure by a paw upon the tripping-plate will release the arm 41 and cause the flue to swing downward by gravity into a position shown by dotted lines in Fig. 4, whereupon the flue will be automatically locked by a plunger 44, which is connected to a hanging closure 45, disposed in the outlet 46, which opens into the lower compartment A of the trap. This plunger 44 engages a notch 47 in the end of the flue, so as to lock it in lowered position. As soon as the flue assumes this position the front end thereof will be closed by the front wall 48 of the casing 32 and the animal must necessarily leave the flue through the outlet 46. Pressure against the closure 45 will swing it upward, so that the animal can enter compartment A, and this movement of the closure will draw the plunger 44 from engagement with the flue 37. As the front end of the flue is heavier than the rear portion thereof, the flue will promptly return by gravity to its initial position and arm 41 will reëngage the hooked arm 42, thereupon resetting the flue. Of course two of these flues are employed, and they can both operate independently in the manner described. If desired, they can be caused to operate alternately in unison, so that the operation of one flue will cause the setting of the other flue. This operation may be produced by mounting a lever 49 within the partition 33, as shown in Figs. 4 and 5, and connecting the ends of the lever by means of links 50 with the sides of the two flues 37. As the points of connection between the links and flues are located in front of the fulcrums of the flues, it is obvious that the two flues will be caused to swing in opposite directions simultaneously. With this construction the plunger 44 is dispensed with, and when one of the plates 43 is tripped and the flue drops by gravity the other flue will be positively raised, so that its arm 41 will engage the hooked arm 42 in the path thereof, thereby locking the two flues in the positions to which they have moved.

The preferred forms of the invention have been set forth in the foregoing description; but I do not limit myself thereto, as I am aware that modifications may be made therein without departing from the spirit or sacrificing the advantages thereof, and I therefore reserve the right to make such changes as fairly fall within the scope of the invention.

What is claimed is—

1. In a trap the combination with a receiving-compartment having inlets, a superposed bait-compartment having inlets; of a casing extending from said compartments and having inlet-openings, flues movably mounted within said casing and adapted to establish communication between two of the openings, and means for releasing the flue to shift into register with the inlet of the receiving-compartment.

2. In a trap the combination with a receiving-compartment having an inlet, a closure for the inlet, and a superposed bait-compartment having an inlet; of a flue movably supported adjacent the compartments adapted to successively register with the inlets of the two compartments, and means for normally locking the flue in alinement with the inlet of the bait-compartment.

3. A trap comprising a receiving-compartment having a normally closed inlet, and a superposed bait-compartment, a movable flue normally locked in alinement with the inlet, of the bait-compartment, means for releasing the flue, said flue adapted when unlocked to move into register with the inlets of the receiving-compartment, and means for closing one end of the flue when opening into the receiving-compartment.

4. In a trap the combination with a receiving-compartment having a normally closed inlet, and a bait-compartment; of a movable flue normally registering with the opening into the bait-compartment, means for securing the flue in register with the bait-compartment, a tripping device in alinement with the flue for unlocking the same, said flue adapted when unlocked to swing by gravity into register with the receiving-compartment, and means for closing one end of the flue when registering with the receiving-compartment.

5. In a trap the combination with a receiving-compartment having a normally closed inlet, a bait-compartment; of oppositely-disposed similar flues adapted to register with the bait-compartment, means for locking the flues in register with the bait-compartment, independently-operated means for unlocking the flues, said flues adapted when released to swing into register with their respective inlets of the receiving-compartment, and means for closing one end of each flue while the same is registering with the receiving-compartment.

6. In a trap the combination with a receiving-compartment having an inlet, and a bait-compartment; of a movable flue normally registering with the bait-compartment, an arm extending from the flue, means for engaging the arm to lock the flue in register with the bait-compartment, and depressible means for disengaging the arm, said flue, when the arm is disengaged, adapted to swing by gravity into register with the receiving-compartment.

7. In a trap the combination with a receiving-compartment, and a bait-compartment; of a movable flue, an arm extending therefrom, means for engaging the arm to lock it in register with the two compartments, a tripping device alining with the flue to release the arm, said flue when released adapted to move automatically into register with the receiving-compartment, and means for closing one end of the flue while registering with said receiving-compartment.

8. In a trap the combination with a receiving-compartment, and a bait-compartment; of a movable flue, an arm extending therefrom, a locking-arm for engaging the arm of the flue, to secure said flue in register with the bait-compartment, a tripping-plate movable with the hooked arm disposed adjacent one end of the flue, said flue adapted when released to move into register with the receiving-compartment, and means for closing one end of the flue while in such position.

9. In a trap the combination with a receiving-compartment, and a bait-compartment; of oppositely movably connected flues, said flues adapted to respectively register with the bait and receiving compartments, means for closing one end of each flue while registering with the receiving-compartment, and means adjacent the bait-compartment for automatically locking the flues in register with the bait-compartments respectively.

10. In a trap the combination with a receiving-compartment, and a bait-compartment; of oppositely-movable flues adapted to simultaneously register with the bait and receiving compartments respectively, means for closing one end of said flues while registering with the receiving-compartment, arms movable with the flues, tripping-plates adjacent the bait-compartment and adapted to aline with the flues, and means movable with the plates for engaging the arms of the flues to lock said flues in register with the two compartments.

In testimony that I claim the foregoing as my own I have hereto affixed my signature in the presence of two witnesses.

WILLIAM RANKIN FINE.

Witnesses:
   B. A. ROBERTS,
   H. F. MIMS.